United States Patent
Han et al.

(10) Patent No.: US 8,391,868 B2
(45) Date of Patent: Mar. 5, 2013

(54) APPARATUS AND METHOD FOR UPDATING NEIGHBOR LIST IN A MOBILE COMMUNICATION SYSTEM

(75) Inventors: Ki-Young Han, Yongin-si (KR); In-Seok Hwang, Seoul (KR); Byoung-Ha Yi, Seoul (KR); Sung-Hyun Choi, Seoul (KR); Young-Kyu Choi, Incheon (KR); Kwang-Hoon Han, Icheon-si (KR); Min-Soo Na, Seoul (KR); Dong-Myung Kim, Seoul (KR)

(73) Assignees: Samsung Electronics Co., Ltd, Suwon-Si (KR); Seoul National University Industry Foundation, Seoul (KR)

( * ) Notice: Subject to any disclaimer, the term of this patent is extended or adjusted under 35 U.S.C. 154(b) by 984 days.

(21) Appl. No.: 12/386,783

(22) Filed: Apr. 23, 2009

(65) Prior Publication Data

US 2009/0270079 A1    Oct. 29, 2009

(30) Foreign Application Priority Data

Apr. 24, 2008    (KR) .................. 10-2008-0038045

(51) Int. Cl.
*H04W 36/00*    (2009.01)

(52) U.S. Cl. .................. 455/436; 455/432.2; 455/435.2; 455/443; 455/444; 455/450; 455/452.1; 455/414.1; 455/41.2

(58) Field of Classification Search .................. 455/436, 455/432.2, 435.2, 443, 444, 450, 452.1, 414.1, 455/41.2
See application file for complete search history.

(56) References Cited

U.S. PATENT DOCUMENTS

2009/0011757 A1*    1/2009    Tenny .......................... 455/425
2009/0137265 A1*    5/2009    Flore et al. .................... 455/525

* cited by examiner

*Primary Examiner* — Kwasi Karikari

(57) ABSTRACT

An apparatus and method for updating a neighbor list in a mobile communication system are provided. The system includes a Mobile Station (MS), a second Base Station (BS), and a first BS. The MS stores first log information, performs a network entry process with the second BS, and generates and transmits second log information to the second BS. The second BS allocates a bandwidth to the MS, receives the second log information, determines if neighbor list update is required using the second log information and, if the neighbor list update is required, updates a neighbor list and transmits the updated neighbor list information to the previous BS.

23 Claims, 5 Drawing Sheets

APPARATUS AND METHOD FOR UPDATING NEIGHBOR LIST IN A MOBILE COMMUNICATION SYSTEM

CROSS-REFERENCE TO RELATED APPLICATION(S) AND CLAIM OF PRIORITY

The present application claims the benefit under 35 U.S.C. §119 to an application filed in the Korean Intellectual Property Office on Apr. 24, 2008 and assigned Serial No. 10-2008-0038045, the contents of which are incorporated herein by reference.

TECHNICAL FIELD OF THE INVENTION

The present invention relates to an apparatus and method for updating a neighbor list in a mobile communication system. More particularly, the present invention relates to an apparatus and method for updating a neighbor list using the stored log information when a Mobile Station (MS) reconnects with a neighbor Base Station (BS) after disconnecting with a serving BS.

BACKGROUND OF THE INVENTION

With the development of communication and the expansion of the spread of a multimedia technology, a diversity of large-capacity transmission technologies is being applied to a mobile communication system. One of their core issues may be an increase of channel capacity. The increase of channel capacity may be realized in a few of methods. The easiest method is a method of allocating more frequencies, but it is impossible to implement the method in actual fact if considering limited frequency resources. Accordingly, there is a need for a method of more efficiently using the limited frequency resources. As methods for this, a method of increasing the efficiency of frequency use and a method of reducing a service cell can be taken into consideration. Particularly, by designing a cell size in small, a wireless channel environment of a better condition and abundant available resources may be provided to a plurality of more user terminals, thus enabling a large capacity service.

A Femto cell, which is a service area of a micro-miniature BS used indoors in a home, an office, and the like, is provided with a wired/wireless convergence service at a low cost by connecting a mobile phone with the Internet. A BS servicing a general macro cell is installed by a mobile communication service provider, whereas the microminiature BS (e.g., a self configuration) is installed by a user.

A plurality of microminiature BSs servicing a Femto cell exist within one BS area servicing the macro cell. The microminiature BS is newly installed or uninstalled by a user from time to time.

A broadband wireless communication system (e.g., an Institute of Electrical and Electronics Engineers (IEEE) 802.16 system) is, for example, described. If a power source is supplied by a user, the microminiature BS does not perform transmission during a downlink and operates in a receive mode like a Mobile Station (MS), thus measuring a signal intensity of a neighbor BS. At this time, on the basis of collected information, the microminiature BS determines Frequency Assignment (FA) to be used, a transmit power, and a neighbor list from a corresponding BS. The neighbor list is a list of candidate BSs for handover. The neighbor list of the BSs may be set in a manual method by a mobile communication service provider or may be automatically set based on signal measurement.

Because the microminiature BS is installed or uninstalled from time to time by a user and not a service provider, it is difficult that corresponding neighbor BSs manually update the microminiature BS in their own neighbor lists. Because of this, methods of updating a neighbor list by measuring a signal of each microminiature BS have been taken into much consideration. This method of updating a neighbor list based on measurement has an advantage of being capable of reducing an overhead for setting the neighbor list. However, a microminiature, and the like, etc. is installed in an office, a home, and so forth, and thus, a corresponding neighbor BS may fail to recognize the microminiature BS or the microminiature BS may fail to recognize a corresponding neighbor BS. Thus, there is a problem that a neighbor list cannot accurately reflect because of an error on measurement, etc.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method and apparatus for, when there is a need for neighbor list update due to a microminiature BS, determining a possible error of a neighbor list based on signal measurement and updating the neighbor list in a mobile communication system.

The above aspect is achieved by providing an apparatus and method for updating a neighbor list in a mobile communication system.

According to one aspect of the present invention, a MS operation method for updating a neighbor list in a mobile communication system is provided. The method includes storing first log information when disconnecting with a first BS, performing a network entry process with a second BS after disconnecting with the first BS, and generating and transmitting second log information to the second BS.

According to another aspect of the present invention, a BS operation method for updating a neighbor list in a mobile communication system is provided. The method includes performing a network entry process with a corresponding MS that disconnects with a previous BS, allocating a bandwidth to the corresponding MS and receiving log information, determining if neighbor list update is required using the log information, and if the neighbor list update is required, updating a neighbor list and transmitting the updated neighbor list information to the previous BS.

According to a further aspect of the present invention, an MS apparatus for updating a neighbor list in a mobile communication system is provided. The apparatus includes a storage unit, a controller, and a log information generator. The storage unit stores first log information when disconnecting with a first BS. The controller performs a network entry process with a second BS after disconnecting with the first BS. The log information generator generates and transmits second log information to the second BS.

According to yet another aspect of the present invention, a BS apparatus for updating a neighbor list in a mobile communication system is provided. The apparatus includes a controller, a neighbor list update determiner, and an interface unit. The controller performs a network entry process with a corresponding MS that disconnects with a previous BS, allocates a bandwidth to the corresponding MS, and receives log information. The neighbor list update determiner determines if neighbor list update is required using the log information. If the neighbor list update is required, the interface unit updates a neighbor list and transmits the updated neighbor list information to the previous BS.

According to yet another aspect of the present invention, a mobile communication system for updating a neighbor list is provided. The system includes an MS, a second BS, and a first BS. The MS stores first log information when disconnecting with the first BS, performs a network entry process with the second BS after disconnecting with the first BS, and generates and transmits second log information to the second BS. The second BS allocates a bandwidth to the MS, receives the second log information, determines if neighbor list update is required using the second log information and, if the neighbor list update is required, updates a neighbor list and transmits the updated neighbor list information to the previous BS. The first BS receives the updated neighbor list information from the second BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention, and can change depending on the intention or practice of a user or operator. Therefore, the definitions should be determined on the basis of the descriptions over the specification.

An apparatus and method for updating neighbor list in a mobile communication system according to an exemplary embodiment of the present invention are described below. Particularly, when a microminiature BS (e.g., a self configurable BS) is installed by a user, an exemplary embodiment of the present invention is to determine an error of updating a neighbor list possible and update the neighbor list through a post feedback.

An exemplary embodiment of the present invention is described by way of an example of an IEEE 802.16 based communication system, but is applicable to any other mobile communication system. In many systems currently developed such as the IEEE 802.16, etc., scanning is preferentially done for candidate BSs recommended on the basis of broadcasted neighbor lists and handover is performed. However, if a suitable neighbor BS is omitted from the neighbor list, upon handover, a wireless link may be disconnected due to interference. Hence, an exemplary embodiment of the present invention proposes an apparatus and method for updating a previous neighbor list, when a MS reconnecting to a different BS that does not exist in the previous neighbor list (i.e., a neighbor list of BSs serviced before disconnection).

Figure 1:
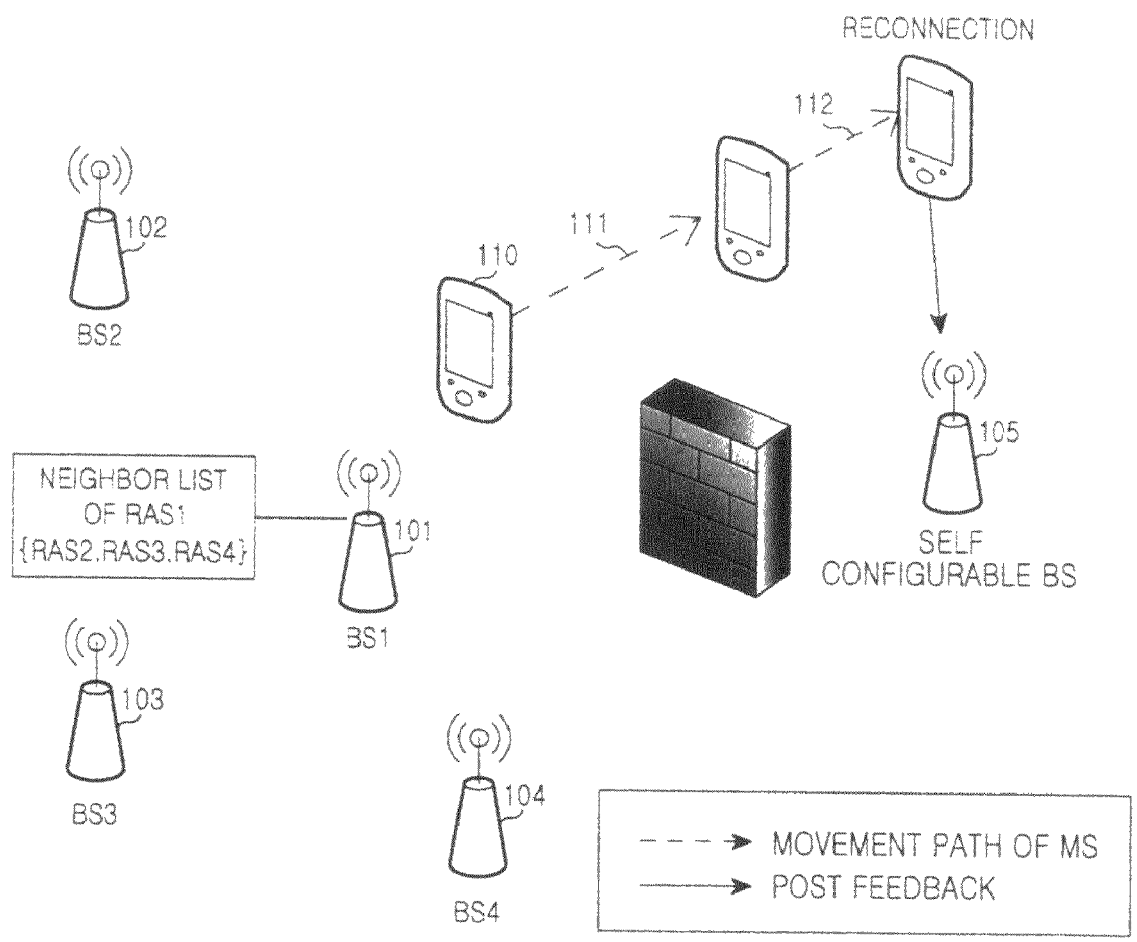
FIG. 1 illustrates a construction of a mobile communication system according to the present invention.

FIG. 1 illustrates a construction of a mobile communication system according to the present invention.

Referring to FIG. 1, BSs 101 through 105 each provides services through wireless interfaces with corresponding MSs in their own cell areas. Also, the BSs 101 through 105 perform a handover process with a corresponding MS not to discontinue a service during a movement of the MS. For this, each of the BSs 101 through 105 broadcasts its own stored neighbor list and, in a handover process, the corresponding MS performs scanning using the neighbor list. The BS1 101 is assumed to have a neighbor list including the BS2 102, BS3 103, and BS4 104. The BSs 101 through 104 are BSs fixedly installed by a service provider, and their neighbor lists can be set by a user. However, the BS5 105, a microminiature BS, may be installed or uninstalled from time to time by a user. Accordingly, when the BS5 105 is installed in an office or a home by a user, the BS5 105 operates like an initial MS and receives a neighbor list from a corresponding BS.

The MS 110 is provided with a service from the BS1 101 that is in a corresponding cell area. In order to move to a different cell area while being provided with a seamless service, the MS 110 receives a neighbor list from the corresponding BS1 101 and, upon handover, performs scanning for neighbor BSs that are in the neighbor list, thus determining a target BS.

The assumption is that the MS 110 is serviced in connection to the BS1 101, and receives and stores a neighbor list.

If there is an obstacle between the BS1 101 and the BS5 105, when assuming that the BSs 101 through 105 each automatically set their own neighbor lists based on signal measurement, there is a high possibility that the BS1 101 and the BS5 105 fail to recognize each other as a neighbor BS. That is because there are many cases in which the BS5 105 (i.e., a microminiature BS installed/uninstalled from time to time by a user) is installed mainly within a building and thus, due to an obstacle of a building wall, the BS5 105 may fail to receive a signal from a neighbor BS, and the like, or the neighbor BS may fail to receive a signal transmitted by the BS5 105 itself. Thus, the BS1 101 and the BS5 105 may not be in registration on each other's neighbor list.

Under this environment (i.e., when the BS1 101 and the BS5 105 are not in registration on each other's neighbor list), when the MS 110 moves from a first path 111 to a second path 112, the MS 110 scans neighbor BSs using a neighbor list received from the BS1 101 and performs handover. However, a link disconnection between the MS 110 and the BS1 101 may take place because the BS5 105 is not in registration on the neighbor list of the MS 110.

In an exemplary embodiment of the present invention, when a link disconnection between the MS 110 and the BS1 101 takes place, the MS 110 stores log information on the BS1 101 (e.g., an IDentifier (ID) of the BS1 101, a neighbor list of the BS1 101, and so forth), performs a network entry process with the neighbor BS5 105, and then transmits the log information stored by the MS 110 to the BS5 105. On the basis of the log information, the BS5 105 determines if there is an error in contents of the neighbor list of the BS1 101 transmitted by the MS 110, and updates the neighbor list. Operations of the MS 110 and the BS5 105 for neighbor list update are described below with reference to FIGS. 2 through 3.

Figure 2:
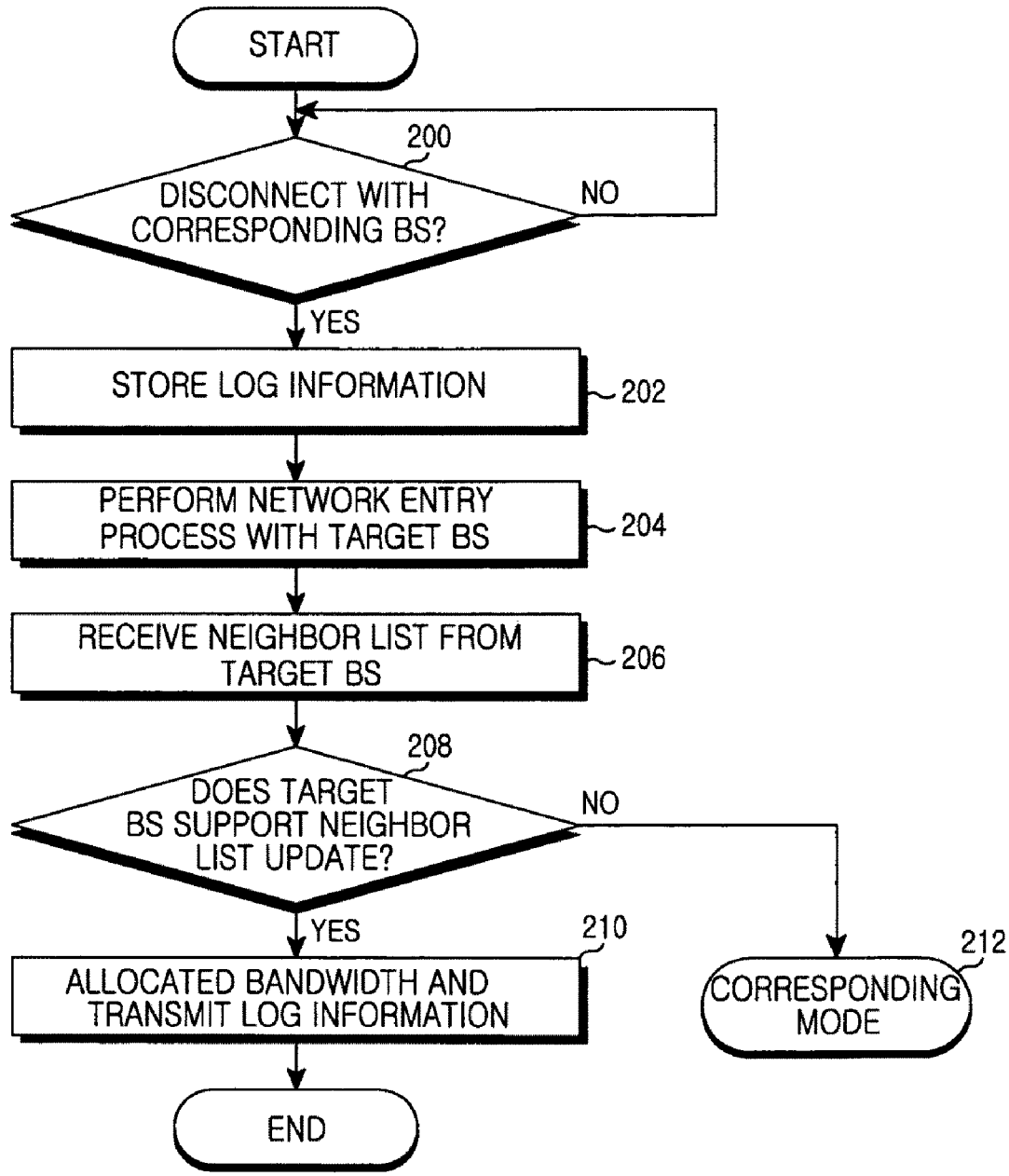
FIG. 2 illustrates a flow diagram for an operation of a mobile station for updating a neighbor list in a mobile communication system according to an exemplary embodiment of the present invention.

FIG. 2 illustrates a flow diagram for an operation of an MS for updating a neighbor list in a mobile communication system according to an exemplary embodiment of the present invention.

Referring to FIG. 2, when an MS disconnects with a corresponding serving BS in step 200, the MS proceeds to step 202 and stores first log information. The stored first log information, which is information that may be stored soon after disconnection, includes a disconnect time stamp recording a disconnection time, BS information before disconnection (e.g., ID information of a previous BS), a neighbor list received from a BS before disconnection, target BS information, a velocity of an MS, a location of an MS, Received Signal Strength Indication (RSSI) of an MS, and the like.

Then, in step 204, the MS performs a network entry process with a neighbor BS through a cell search. For example, in FIG. 1, the MS 110 performs a network entry process with the BS5 105 after disconnecting with the BS1 101. At this time, the MS may be aware of if the neighbor BS (i.e., the BS5 105) supports a neighbor list update through the network entry process.

Then, in step 206, the MS receives a broadcasted neighbor list from the neighbor BS. However, as in FIG. 1, because of an obstacle between the BS1 101 and the BS5 105, the BS1 101 is not in registration on the broadcasted neighbor list. Similarly, the BS5 105 is not in registration even on the neighbor list that the MS receives from the BS1 101.

Then, in step 208, the MS determines if the neighbor BS supports neighbor list update. If the neighbor BS supports the neighbor list update, in step 210, the MS is allocated a bandwidth and transmits second log information. If the neighbor BS does not support the neighbor list update, the MS proceeds to a corresponding mode in step 212. In the corresponding mode, the log information is not transmitted because, although the log information is transmitted to the neighbor BS not supporting the neighbor list update, the neighbor BS does not need to use the log information.

The second log information is information on an addition of a current measurement value to the stored first log information and, as then addable information, a time stamp representing current time, current RSSI information, cell IDs for other neighbor BSs searched at the time of network entry, Frequency Assignment (FA), RSSI information, and so forth, and, if acquirement is possible through a peripheral equipment of a Global Positioning System (GPS), and the like, even current a location of a MS and mobility information, and the like, may be newly added and transmitted.

Then, the MS terminates the neighbor list update process of the MS.

As described above, when disconnecting with a corresponding BS, the MS performs a network entry process with a neighbor BS and, if the neighbor BS is a BS supporting neighbor list update, requests for a bandwidth necessary for transmitting log information and transmits the log information. BSs not supporting automatic neighbor list update may exist by many counts. Then, in order to prevent needless overheads, determining if a neighbor BS performs neighbor list update and transmitting log information can be added as an option.

Figure 3:
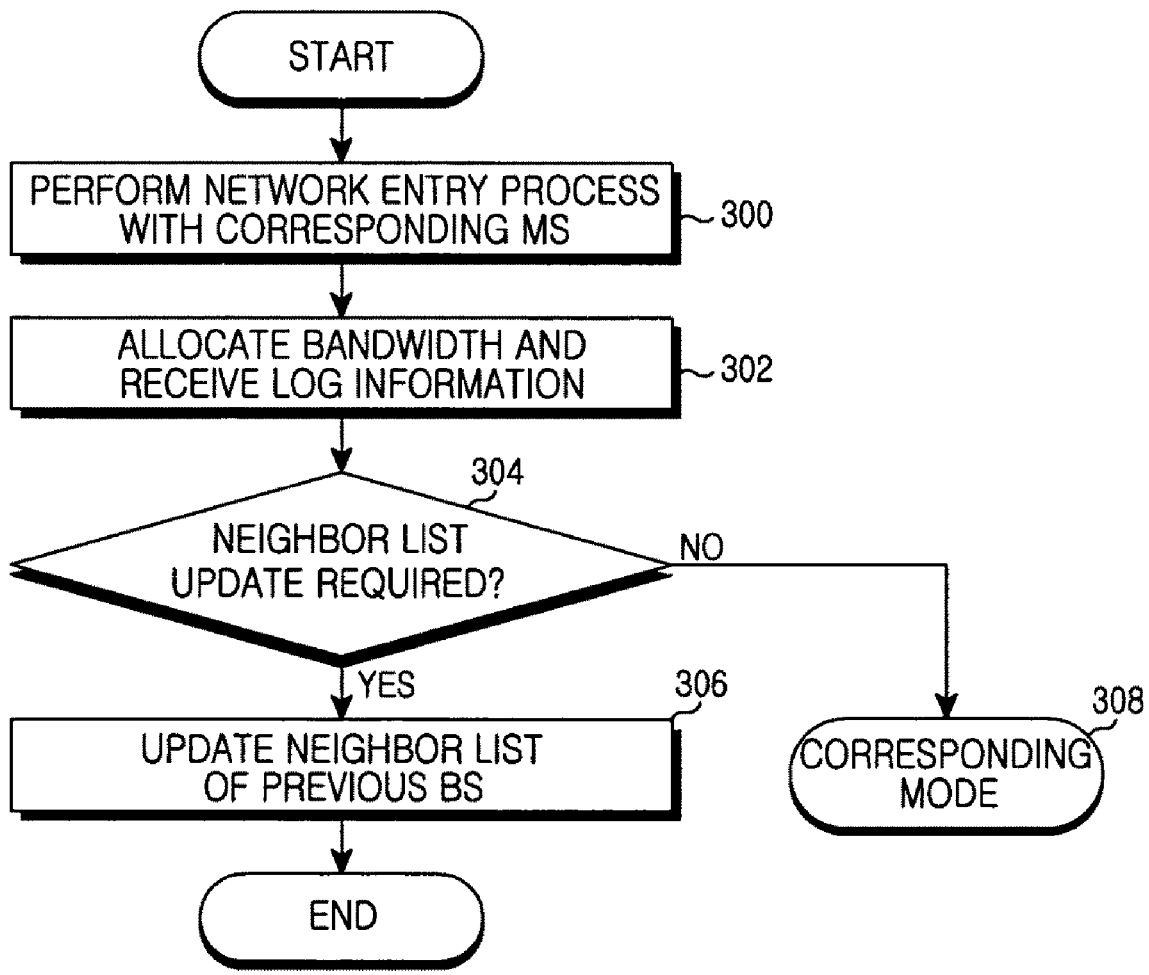
FIG. 3 illustrates a flow diagram for an operation of a base station for updating a neighbor list in a mobile communication system according to an exemplary embodiment of the present invention.

FIG. 3 illustrates an operation of a BS for updating a neighbor list in a mobile communication system according to an exemplary embodiment of the present invention.

Referring to FIG. 3, in step 300, a BS 105 performs a network entry process with a corresponding MS and, in step 302, allocates a bandwidth and receives second log information from the corresponding MS.

Then, in step 304, the BS determines if neighbor list update is required. If the neighbor list update is required, the BS proceeds to step 306 and updates a neighbor list of a previous BS 101. If the neighbor list update is not required, the BS proceeds to a corresponding mode in step 308.

That is, the BS detects a neighbor list error of the previous BS 101 or the current BS 105 on the basis of log information reported from a corresponding MS. A process of determining the validity of the neighbor list error may be implemented according to the following example.

First, the assumption is that, if the BS 105 newly connected is not included in neighbor list information of the previous BS 101, there is an error in a neighbor list of the previous BS 101. A BS connected just after a link disconnection is determined as above in that there is a high possibility that it is actually positioned in a neighbor.

In other words, determining that there is a high possibility that the BS 105 newly connected just after a link disconnection is actually positioned in a neighbor is suitable determination only when disconnection time and a distance of mobility during a link disconnection are not greater than threshold values. Thus, on the basis of disconnection time and mobility information of an MS, on the assumption that an MS does not greatly move after disconnection, it can be determined that there is an error in a neighbor list. The mobility information of the MS may be provided in an upper network entity (e.g., a switching center) and, if location information of an MS is available, an error or non-error of a neighbor list can be determined with more accuracy.

In another exemplary implementation of determining a neighbor list error, only if a receive RSSI on disconnection is greater than a threshold value, it can be determined to be disconnection caused by neighbor list omission. This is to prevent unnecessary overheads in order to transmit log information if, although disconnection time is short, it fails to solve by only neighbor list update because there is a service coverage hole in the middle with a previous BS.

If it is determined that there are errors in neighbor lists of the previous BS 101 and the current BS 105, it is required to exchange neighbor list information through a backbone network such as a Wireless System Manager (WSM) server, and the like, in order to update the neighbor lists. Updating whenever information comes up may lead to an increase of overheads and thus, when similar information is accumulated as much as any level or more, a corresponding BS updates information or transmits information to a related different BS (e.g., a previous BS), thus being able to update a neighbor list. For example, in FIG. 1, the BS5 105 can determine a neighbor list error using log information reported by an MS and thus, transmit updated neighbor list information directly to the BS1 101 through a backbone network, or transmit the updated neighbor list information to the WSM server and transmit the updated neighbor list information to the BS1 101 through the WSM server.

Then, the neighbor list update process of the BS is terminated.

Figure 4:
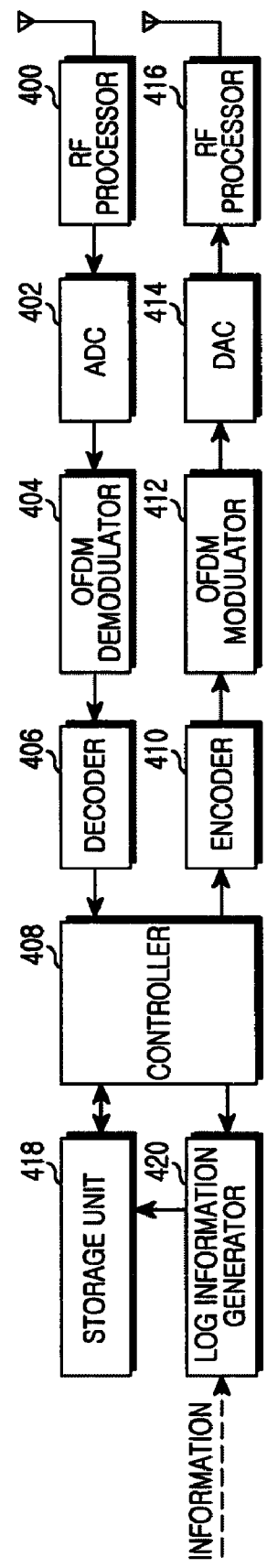
FIG. 4 illustrates a block diagram for a construction of an MS for updating a neighbor list in a mobile communication system according to an exemplary embodiment of the present invention.

In FIGS. 3 and 4, a description has been made for one example that, if the MS 110 stores log information after disconnection to update a neighbor list and transmits the log information at the time of network entry to the BS5 105, the BS5 105 determines neighbor list update. However, in a different exemplary implementation, the MS 110 may also store log information after disconnection, receive information necessary for network entry to the BS5 105, determine neighbor list update, and inform the BS5 105 of the determination result.

FIG. 4 illustrates an MS for updating a neighbor list in a mobile communication system according to an exemplary embodiment of the present invention.

Referring to FIG. 4, an MS 110 includes a Radio Frequency (RF) processor 400, an Analog to Digital Converter (ADC) 402, an Orthogonal Frequency Division Multiplexing (OFDM) demodulator 404, a decoder 406, a controller 408, an encoder 410, an OFDM modulator 412, a Digital to Analog Converter (DAC) 414, an RF processor 416, a storage unit 418, and a log information generator 420. The receive RF processor 400 and transmit RF processor 410 may operate in a Frequency Division Duplex (FDD) or Time Division Duplex (TDD) mode.

During a reception duration, the RF processor 400 converts an RF signal received through an antenna into a baseband analog signal. The ADC 402 converts the analog signal from the RF processor 400 into sample data. The OFDM demodulator 404 processes the sample data output from the ADC 402 by Fast Fourier Transform (FFT), converts the processed data into frequency-domain data, and selects data of subcarriers actually intended for reception from the frequency-domain data. The decoder 406 demodulates and decodes the data from the OFDM demodulator 404 according to a predefined modulation level (i.e., a Modulation and Coding Scheme (MCS) level).

The controller 408 controls a general operation of the MS or a BS and, after disconnecting with the BS, performs a network entry process with a neighbor BS. If connecting with the neighbor BS, the controller 408 receives log information stored in the storage unit 418 and transmits the log information to the neighbor BS.

Upon disconnecting with a BS, the storage unit 418 stores log information. Upon network entry with a neighbor BS and connection with the neighbor BS, the storage unit 418 provides the log information to the controller 418.

Upon disconnecting with a BS, the log information generator 420 generates disconnection log information. The log information includes a disconnect time stamp recording a disconnection time, BS information before disconnection, a neighbor list received from the BS before disconnection, target BS information, a movement speed of an MS, position information, RSSI information, and the like Among them, partial information can be again measured and transmitted.

The encoder 410 encodes and modulates data from the controller 408 according to a predefined modulation level (i.e., an MCS level). The OFDM modulator 412 processes, by Inverse Fast Fourier Transform (IFFT), the data from the encoder 410 and outputs sample data (i.e., an OFDM symbol). The DAC 414 converts the sample data into an analog signal. The RF processor 416 converts the analog signal from the DAC 414 into an RF signal and transmits the RF signal through an antenna.

In the aforementioned construction, the controller 408 is a protocol controller and controls the log information generator 420. That is, the controller 408 can perform a function of the log information generator 420. These are separately constructed and shown in order to distinguish and describe respective functions in the present invention. Thus, in an actual realization, construction can be such that all of them are processed in the controller 408, and construction can be such that only part of them is processed in the controller 408. Alternatively, the controller 408 receives necessary information during execution of a protocol process by a corresponding constituent unit of a physical layer or generates a control signal by a corresponding constituent unit of the physical layer.

Figure 5:
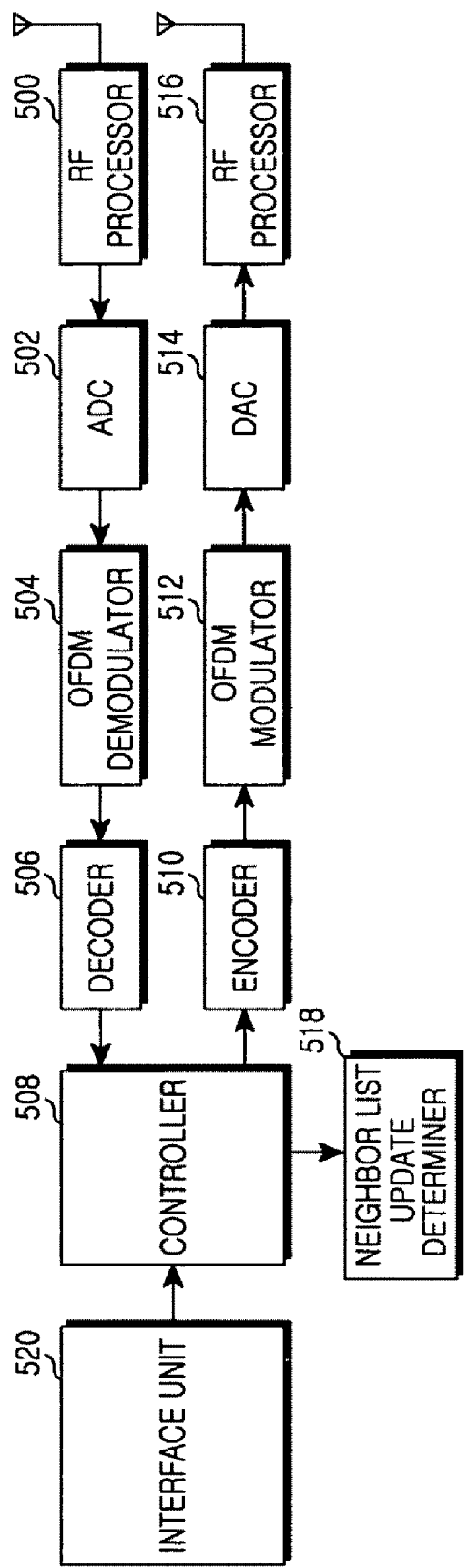
FIG. 5 illustrates a block diagram for a construction of a BS for updating a neighbor list in a mobile communication system according to an exemplary embodiment of the present invention.

FIG. 5 illustrates a BS for updating a neighbor list in a mobile communication system according to an exemplary embodiment of the present invention.

Referring to FIG. 5, a BS 105 includes an RF processor 500, an ADC 502, an OFDM demodulator 504, a decoder 506, a controller 508, an encoder 510, an OFDM modulator 512, a DAC 514, an RF processor 516, an interface unit 520, and a neighbor list update determiner 518. Functions of the RF processor 500, the ADC 502, the OFDM demodulator 504, the decoder 506, the encoder 510, the OFDM modulator 512, the DAC 514, and the RF processor 516 are identical with the functions of FIG. 4 and thus, a detailed description thereof is referred to FIG. 4.

The controller 508 controls a general operation of the BS, performs a network entry process with a corresponding MS that disconnects with a previous BS, allocates a bandwidth to the corresponding MS, and receives log information.

The neighbor list update determiner 518 determines if neighbor list update is required, using the log information from the controller 508.

For example, when a movement distance of an MS is not large during disconnection, when disconnection time is shorter than a threshold value, the neighbor list update determiner 518 performs neighbor list update including a previous BS. In a different example, if a receive RSSI on disconnection is greater than a threshold value, the neighbor list update determiner 518 can also perform the neighbor list update including the previous BS.

When the neighbor list update is required, the interface unit 520 updates a neighbor list and transmits the updated neighbor list information to the previous BS.

In the aforementioned construction, the controller 508, which is a protocol controller, controls the neighbor list update determiner 518. That is, the controller 508 can perform a function of the neighbor list update determiner 518. These are separately constructed and shown in order to distinguish and describe respective functions in the present invention. Thus, in an actual realization, construction can be such that all of them are processed in the controller 508 and construction can be such that only part of them is processed in the controller 508. Alternately, the controller 508 receives necessary information during execution of a protocol process by a corresponding constituent unit of a physical layer or generates a control signal by a corresponding constituent unit of the physical layer.

As described above, exemplary embodiments of the present invention have an advantage of being capable of updating a neighbor list reflecting microminiature BSs in a wireless environment in which the microminiature BSs are installed/uninstalled by a user, by updating a neighbor list on the basis of log information stored at the time of disconnection in a mobile communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a Mobile Station (MS) for updating a neighbor list in a mobile communication system, the method comprising:
storing first log information, when disconnecting with a first Base Station (BS);
performing a network entry process with a second BS, after disconnecting with the first BS;
determining whether the second BS supports a neighbor list update; and
generating and transmitting second log information to the second BS, in response to determining that the second BS supports the neighbor list update.

2. The method of claim 1, wherein the first BS is a BS providing a service before disconnecting with the MS, and the second BS is a BS providing a service to the MS after the MS disconnects with the first BS.

3. The method of claim 1, further comprising receiving a neighbor list from the second BS.

4. The method of claim 1, wherein, in response to determining that the second BS does not support the neighbor list update, the second log information is not transmitted.

5. The method of claim 1, wherein the first log information comprises at least one of a disconnect time stamp recording a disconnection time, first BS information before disconnection, a neighbor list received from a BS before disconnection, target BS information, a mobility of an MS, a location of an MS, and Received Signal Strength Indication (RSSI) information.

6. The method of claim 1, wherein the second log information is information on an addition of a current measurement value to the first log information and comprises, as additional information, a time stamp representing current time, received signal strength indication (RSSI) information, cell IDentifiers (IDs) for other neighbor BSs searched at the time of network entry, Frequency Assignment (FA), and, when acquirement is possible through a neighbor equipment of a Global Positioning System (GPS), a current location of an MS and mobility information.

7. A method of operating a Base Station (BS) for updating a neighbor list in a mobile communication system, the method comprising:
performing a network entry process with a corresponding MS that disconnects with a previous BS;
allocating a bandwidth to the corresponding MS and receiving log information;
determining whether a neighbor list update is required using the log information; and
updating a neighbor list in response to determining that the neighbor list update is required and transmitting updated neighbor list information to the previous BS.

8. The method of claim 7, wherein transmitting the updated neighbor list information to the previous BS comprises one of transmitting the updated neighbor list directly to the previous BS through a backbone network, and transmitting to a Wireless System Manager (WSM) server through the WSM server.

9. The method of claim 7, wherein determining if the neighbor list update is required comprises updating the neighbor list comprising the previous BS when a mobility distance of an MS is not greater than a threshold value during a link disconnection and when a link disconnection time is shorter than a threshold value.

10. The method of claim 7, wherein determining if the neighbor list update is required comprises updating the neighbor list comprising the previous BS when a received signal strength indication (RSSI) on disconnection is greater than a threshold value.

11. The method of claim 7, further comprising broadcasting neighbor list information to the corresponding MS.

12. An apparatus of a Mobile Station (MS) configured to update a neighbor list in a mobile communication system, the apparatus comprising:
a storage unit configured to store first log information, when disconnecting with a first Base Station (BS);
a controller configured to store a network entry process with a second BS, after disconnecting with the first BS and determine whether the second BS supports a neighbor list update; and
a log information generator configured to generate and transmit second log information to the second BS, in response to a determination that the second BS supports the neighbor list update.

13. The apparatus of claim 12, wherein the first BS is a BS configured to provide a service before disconnecting with the MS, and the second BS is a BS configured to provide a service to the MS after the MS disconnects with the first BS.

14. The apparatus of claim 12, wherein the controller is configured to receive a neighbor list from the second BS.

15. The apparatus of claim 12, wherein, in response to a determination that the second BS does not support the neighbor list update, the second log information is not transmitted.

16. The apparatus of claim 12, wherein the first log information comprises at least one of a disconnect time stamp recording disconnection time, first BS information before disconnection, a neighbor list received from a BS before disconnection, target BS information, a mobility of an MS, a location of an MS, and Received Signal Strength Indication (RSSI) information.

17. The apparatus of claim 12, wherein the second log information is information on an addition of a current measurement value to the first log information and comprises, as additional information, a time stamp representing current time, received signal strength indication (RSSI) information, cell IDentifiers (IDs) for other neighbor BSs searched at the time of network entry, Frequency Assignment (FA), and, when acquirement is possible through a neighbor equipment of a Global Positioning System (GPS), a current location of an MS and mobility information.

18. An apparatus of a Base Station (BS) configured to update a neighbor list in a mobile communication system, the apparatus comprising:
    a controller configured to perform a network entry process with a corresponding MS that disconnects with a previous BS, allocate a bandwidth to the corresponding MS, and receive log information;
    a neighbor list update determiner configured to determine whether a neighbor list update is required using the log information; and
    an interface unit configured to update a neighbor list, in response to a determination that the neighbor list update is required and transmit updated neighbor list information to the previous BS.

19. The apparatus of claim 18, wherein the interface unit is configured to one of transmit the updated neighbor list directly to the previous BS through a backbone network, and transmit to a Wireless System Manager (WSM) server and through the WSM server.

20. The apparatus of claim 18, wherein the neighbor list update determiner is configured to update the neighbor list comprising the previous BS when a mobility distance of an MS is not greater than a threshold value during disconnection and when disconnection time is shorter than a threshold value.

21. The apparatus of claim 18, wherein the neighbor list update determiner configured to update the neighbor list comprising the previous BS when a received signal strength indication (RSSI) on disconnection is greater than a threshold value.

22. The apparatus of claim 18, wherein the controller is configured to broadcast neighbor list information to the corresponding MS.

23. A mobile communication system for updating a neighbor list, the system comprising:
    a Mobile Station (MS) configured to store first log information when disconnecting with a first Base Station (BS), perform a network entry process with a second BS after disconnecting with the first BS, and generate and transmit second log information to the second BS;
    the second BS configured to allocate a bandwidth to the MS, receive the second log information, determine whether a neighbor list update is required using the second log information and, in response to determining that the neighbor list update is required, update a neighbor list and transmit updated neighbor list information to the first BS; and
    the first BS configured to receive the updated neighbor list information from the second BS.

* * * * *